(12) United States Patent
Suzuki et al.

(10) Patent No.: US 11,650,155 B2
(45) Date of Patent: May 16, 2023

(54) GAS ANALYSIS SYSTEM AND GAS ANALYSIS METHOD

(71) Applicant: YOKOGAWA ELECTRIC CORPORATION, Tokyo (JP)

(72) Inventors: Yuta Suzuki, Tokyo (JP); Yuma Kitagawa, Tokyo (JP); Toshiyuki Saruya, Tokyo (JP); Nobuhiko Kanbara, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 17/390,074

(22) Filed: Jul. 30, 2021

(65) Prior Publication Data

US 2022/0034807 A1 Feb. 3, 2022

(30) Foreign Application Priority Data

Jul. 31, 2020 (JP) .............................. JP2020-130550

(51) Int. Cl.
*G01N 21/61* (2006.01)

(52) U.S. Cl.
CPC ........ *G01N 21/61* (2013.01); *G01N 2201/068* (2013.01); *G01N 2201/0612* (2013.01); *G01N 2201/121* (2013.01)

(58) Field of Classification Search
CPC ........ G01N 21/61; G01N 21/39; G01N 21/31; G01N 3301/0612; G01N 3301/068; G01N 3301/399; G01N 3301/0691; G01J 3/433
See application file for complete search history.

(56) References Cited

FOREIGN PATENT DOCUMENTS

| JP | H07151683 A | 6/1995 |
|----|-------------|--------|
| JP | 2020115118 A * | 7/2020 |
| WO | 2017/014097 A1 | 1/2017 |

* cited by examiner

*Primary Examiner* — Rebecca C Bryant
(74) *Attorney, Agent, or Firm* — Osha Bergman Watanabe & Burton LLP

(57) ABSTRACT

A gas analysis system, includes: a light-emitting element that emits a laser light modulated by a predetermined modulation frequency; and a light-receiving element that: receives the laser light that has passed through a measurement target gas; and upon receiving the laser light, outputs a received signal having an N-frequency that is n times the predetermined modulation frequency, wherein n is an integer no less than 2; and a signal processing device that: calculates a third component by removing, from a first component having the N-frequency, a second component, wherein the second component is a component of optical interference noise arising on an optical path of the laser light from the light-emitting element to the light-receiving element and has the same frequency as the first component; and calculates, based on a magnitude of the third component, a concentration of the measurement target gas.

6 Claims, 6 Drawing Sheets

Concentration [ppmm]

Concentration [ppmm]

GAS ANALYSIS SYSTEM AND GAS ANALYSIS METHOD

BACKGROUND

Technical Field

The present invention generally relates to a gas analysis system and a gas analysis method.

Related Art

Among gas analysis systems that analyze a measurement target gas, there is one that measures a concentration of a measurement target gas based on an absorbance of light irradiated to the measurement target gas. In such a gas analysis system, to increase measurement precision (sensitivity), wavelength-modulation spectroscopy is sometimes used. Wavelength-modulation spectroscopy is a technique of irradiating a laser light modulated by a modulation frequency f to a measurement target gas and measuring a concentration of the measurement target gas based on a second-order harmonic component (2f component) obtained by detecting the laser light upon its transmission through the measurement target gas.

In wavelength-modulation spectroscopy, the concentration of the measurement target gas is often measured upon calculating a ratio of the 2f component to a component (1f component) of the modulation frequency f that is detected and standardizing a light reception amount. This is to reduce an effect of fluctuations in the light reception amount of the laser light due to factors other than the measurement target gas. Note that wavelength-modulation spectroscopy is also sometimes referred to as 2f detection. Patent literature 1 below discloses one example of a conventional gas analysis system that uses wavelength-modulation spectroscopy to measure a gas concentration.

PATENT LITERATURE

Patent Literature 1: WO 2017/014097 A1

Now, in the above gas analysis system, optical interference noise may be generated when the laser light passes through a lens or other optical element, a window, a thin film, or the like. This optical interference noise arises due to, for example, interference caused by the laser light upon undergoing multiple reflection inside an optical element or the like, and a magnitude thereof changes periodically depending on a wavelength of the laser light. For example, just as a transmittance of a Fabry-Pérot etalon becomes periodic relative to wavelength, the magnitude of the optical interference noise also becomes periodic relative to the wavelength. When there is such optical interference noise, there is a problem of a worsened detection limit of the concentration of the measurement target gas.

SUMMARY

One or more embodiments provide a gas analysis system and a gas analysis method that can improve a detection limit of a concentration of a measurement target gas.

According to one or more embodiments, a gas analysis system (1) includes: a light-emitting element (13) that emits a laser light modulated by a predetermined modulation frequency (f); a light-receiving element (17) that receives the laser light upon the laser light passing through a measurement target gas (GS); and a signal processing device (20) that calculates a concentration of the measurement target gas based on a magnitude of a third component obtained by removing, from a first component that is a component having an N-frequency, meaning a frequency n times (n being an integer no less than 2) the modulation frequency included in a received signal output from the light-receiving element, a second component that is a component, of the same frequency as the first component, of optical interference noise arising on an optical path of the laser light from the light-emitting element to the light-receiving element.

Furthermore, the gas analysis system according to one or more embodiments is provided with a detector (19) that detects an amplitude ($R_{2f}$) and a phase ($\theta_{2f}$) of the first component included in the received signal, and the signal processing device is provided with a storage (21) that stores an amplitude ($R_0$, $R_{02f}$) and a phase ($\theta_0$, $\theta_{02f}$) of the second component and a processor that calculates the third component by using the amplitude and the phase of the first component detected by the detector and the amplitude and the phase of the second component stored in the storage to perform a computation of removing the second component from the first component.

Furthermore, in the gas analysis system according to one or more embodiments, the detector detects, in addition to the first component, a fundamental component that is a component having the same frequency as the modulation frequency included in the received signal, and the processor calculates the concentration of the measurement target gas based on a ratio ($R'_{2f}/R_{1f}$) of an amplitude ($R'_{2f}$) of the third component to an amplitude ($R_{1f}$) of the fundamental component.

Furthermore, in the gas analysis system according to one or more embodiments, the amplitude and the phase of the second component stored in the storage are an amplitude and a phase of the first component detected by the detector at a time when the measurement target gas is not present on the optical path of the laser light or a state where the concentration of the measurement target gas on the optical path of the laser light is sufficiently low.

Alternatively, in the gas analysis system according to one or more embodiments, the amplitude and the phase of the second component stored in the storage are an amplitude and a phase obtained by performing a predetermined computation using an amplitude and a phase of the first component detected by the detector at a time when the measurement target gas is present on the optical path of the laser light at a known first concentration and an amplitude and a phase of the first component detected by the detector at a time when the measurement target gas is present on the optical path of the laser light at a known second concentration.

Alternatively, in the gas analysis system according to one or more embodiments, the amplitude and the phase of the second component stored in the storage are an amplitude and a phase of the first component detected by the detector at a time when an optical path length of the laser light is set to a reference length prescribed in advance, and the processor calculates the third component by performing a computation of removing the second component from the first component upon correcting, based on a difference between a phase of the fundamental component detected by the detector at a time when the optical path length of the laser light is not set to the reference length and a phase of the fundamental component detected by the detector at the time when the optical path length of the laser light is set to the reference length, a phase of the first component detected by the detector at the time when the optical path length of the laser light is not set to the reference length.

A gas analysis method according to one or more embodiments has: a first step of emitting a laser light modulated by a predetermined modulation frequency (f); a second step of obtaining a received signal by receiving the laser light upon the laser light passing through a measurement target gas (GS); a third step (S14, S25) of obtaining a third component by removing, from a first component that is a component having an N-frequency that is n times (n being an integer no less than 2) the modulation frequency included in the received signal, a second component that is a component, of the same frequency as the first component, of optical interference noise arising on an optical path of the laser light; and a fourth step (S15, S26) of calculating a concentration of the measurement target gas based on a magnitude of the third component.

Furthermore, the gas analysis method according to one or more embodiments further includes: a step (S11, S12, S21, S22) of calculating the second component in advance, prior to measuring the measurement target gas.

One or more embodiments can improve a detection limit of a concentration of a measurement target gas.

DETAILED DESCRIPTION

Figure 1:
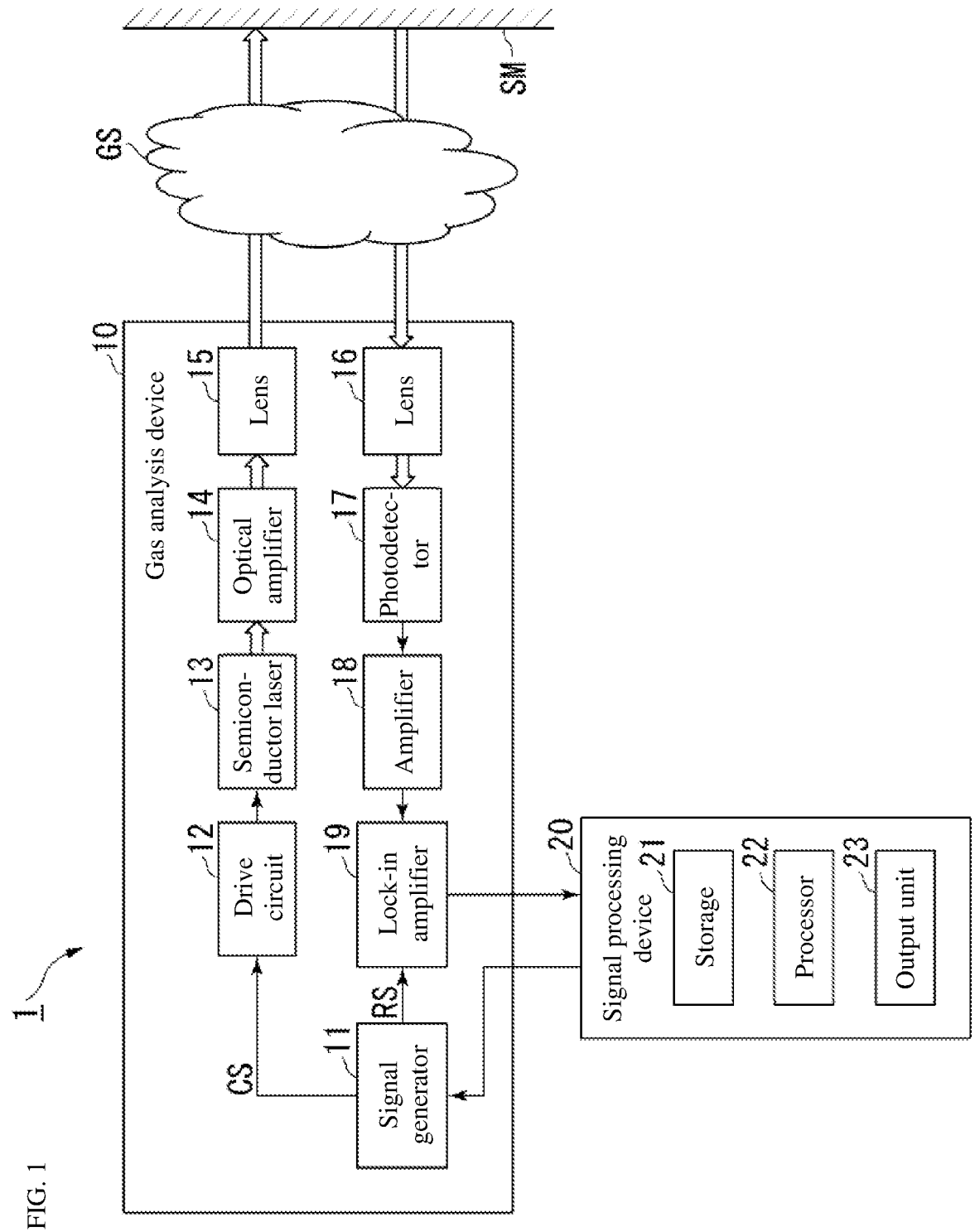
FIG. 1 is a block diagram illustrating a configuration of main parts of a gas analysis system according to a first embodiment.

Gas analysis systems and gas analysis methods according to one or more embodiments of the present invention are described in detail below with reference to the drawings. In the following, first, an overview of the present embodiments is described. Afterward, details of each embodiment are described.

[Overview]

One or more embodiments enable an improvement of a detection limit of a concentration of a measurement target gas. For example, they enable high-precision measurement of a concentration of a measurement target gas even when the concentration of the measurement target gas is low. That is, they enable high-precision measurement of the concentration of the measurement target gas even near a detection limit that is found theoretically.

In wavelength-modulation spectroscopy, a magnitude of an amplitude of a second-order harmonic component (2f component) that is detected is represented by formula (1) below.

[Math. 1]

$$I_s = \sqrt{2} s P_{dc} k_2 \alpha_0 C_R \qquad (1)$$

In formula (1) above, $I_S$ is the magnitude (RMS: root mean square) of the amplitude of the 2f component. Moreover, s is a coefficient indicating a sensitivity of a light-receiving element, $P_{dc}$ is a received power of a laser light, and $k_2$ is a constant determined by a modulation frequency of the laser light. Moreover, $\alpha_0$ is an absorbance at a center wavelength of a measurement target gas, and $C_R$ is a gas concentration of the measurement target gas.

Furthermore, noise $I_N$ of the 2f component that is detected is represented by formula (2) below.

[Math. 2]

$$I_N = \left( \frac{s^2(RIN)P_{dc}^2 + 2e(sP_{dc} + I_{dark}) + 4k_BT/R_{sh}}{2\Delta t} \right)^{1/2} \qquad (2)$$

In formula (2) above, RIN is relative intensity noise of a laser light source, and $I_{dark}$ is a dark current of the light-receiving element. Moreover, e is the elementary charge, $k_B$ is the Boltzmann constant, T is a temperature of the light-receiving element, $R_{sh}$ is a shunt resistance of the light-receiving element, and $\Delta t$ is a time constant of a lock-in amplifier used to detect the 2f component.

A detection limit $C_R^{limit}$ of the concentration of the measurement target gas when a signal-to-noise ratio (SN ratio: signal-noise ratio) is "1" is indicated by formula (3) below.

[Math. 3]

$$C_R^{limit} = \frac{1}{k_2 \alpha_0} \left[ \left( \frac{RIN}{2} + \frac{e}{sP_{dc}} + \frac{eI_{dark} + 2k_BT/R_{sh}}{(sP_{dc})^2} \right) \frac{1}{2\Delta t} \right]^{1/2} \qquad (3)$$

Here, in formula (2) above indicating the noise $I_N$ of the 2f component and formula (3) above indicating the detection limit $C_R^{limit}$ of the concentration of the measurement target gas, optical interference noise is not taken into consideration. Optical interference noise is generated when the laser light passes through a lens or other optical element, a window, a thin film, or the like. For example, optical interference noise arises due to interference caused by the laser light upon undergoing multiple reflection inside an optical element or the like, and a magnitude thereof changes periodically depending on a wavelength of the laser light or a thickness of the optical element or the like. As such, for example, when a full width at half maximum of the optical interference noise and a full width at half maximum of an absorption spectrum of the measurement target gas are at the same level due to the thickness of the optical element or the like, it is difficult to separate the optical interference noise and the absorption spectrum of the measurement target gas.

Such optical interference noise can be removed (or reduced) by, for example, applying the following measures (optical measures).

Forming an antireflective film (AR film) on an incidence face and an emission face of the optical element or the like that is the cause
  Inclining the incidence face and the emission face of the optical element or the like that is the cause relative to an optical path of the laser light
  Designing the FWHM (full width at half maximum) of the absorption spectrum and a period of optical interference to not be the same level However, applying these measures involves demerits such as increased costs, a complicated configuration, reduced freedom in design, and cumbersome adjustment.

In one or more embodiments, first, a laser light modulated by a predetermined modulation frequency is emitted, and a received signal is obtained by receiving the laser light upon its passing through a measurement target gas. Next, from a first component, which is a component having an N-frequency that is n times (n being an integer no less than 2) the modulation frequency included in the received signal, a second component, which is a component of the same frequency as the first component of optical interference noise arising on an optical path of the laser light, is removed to obtain a third component. Then, a concentration of the measurement target gas is found based on a magnitude of the third component. This enables improvement of a detection limit of the concentration of the measurement target gas without giving rise to demerits such as increased costs, a complicated configuration, reduced freedom in design, and cumbersome adjustment.

First Embodiment

<Gas Analysis System>

FIG. 1 is a block diagram illustrating a configuration of main parts of a gas analysis system according to a first embodiment. As illustrated in FIG. 1, a gas analysis system 1 of the present embodiment is provided with a gas analysis device 10 and a signal processing device 20, which is referred to as a processing unit, and uses wavelength-modulation spectroscopy to measure a concentration of a measurement target gas GS. For example, the gas analysis system 1 of the present embodiment irradiates a laser light modulated by a modulation frequency f to the measurement target gas GS and measures the concentration of the measurement target gas GS based on a second-order harmonic component (2f component) that is detected.

The gas analysis device 10 is provided with a signal generator 11, a drive circuit 12, a semiconductor laser 13 (light-emitting element), an optical amplifier 14, a lens 15, a lens 16, a photodetector 17 (light-receiving element), an amplifier 18, and a lock-in amplifier 19 (detector). Such a gas analysis device 10 performs emission of the laser light irradiated to the measurement target gas GS, reception of the laser light via the measurement target gas GS, detection of a component of the modulation frequency f (1f component) and the 2f component included in a received signal, and the like.

As controlled by the signal processing device 20, the signal generator 11 outputs a control signal CS for controlling the drive circuit 12 and a reference signal RS used in the lock-in amplifier 19. The reference signal RS output from the signal generator 11 is synchronized with the control signal CS output from the signal generator 11. As this signal generator 11, for example, an arbitrary waveform generator or a function generator can be used.

Based on the control signal CS output from the signal generator 11, the drive circuit 12 outputs a drive signal for driving the semiconductor laser 13. The drive signal output from the drive circuit 12 is, for example, a signal wherein an alternating current of the modulation frequency f is superimposed on a direct current having a certain magnitude (amplitude). Note that the alternating current of the modulation frequency f may be, for example, sinusoidal or non-sinusoidal.

The semiconductor laser 13 is driven by the drive signal output from the drive circuit 12 and emits the laser light irradiated to the measurement target gas GS. The laser light emitted from the semiconductor laser 13 is, for example, a laser light wherein a center wavelength of modulation is a center wavelength of an absorption spectrum of the measurement target gas GS and a wavelength modulation width (modulation frequency f) is 2.2 times a FWHM of the absorption spectrum of the measurement target gas GS. The wavelength modulation width (modulation frequency f) of the laser light emitted from the semiconductor laser 13 may be no less than 1 time, no less than 2 times, or no less than 10 times the FWHM of the absorption spectrum of the measurement target gas GS. Note that as the semiconductor laser 13, for example, a QCL (quantum cascade laser) or an ICL (interband cascade laser) can be used.

The optical amplifier 14 amplifies the laser light emitted from the semiconductor laser 13. As this optical amplifier 14, for example, an optical fiber amplifier or a semiconductor optical amplifier can be used. The lens 15 converts the laser light passed through the optical amplifier 14 into parallel light. As such a lens 15, a collimating lens can be used. Note that another optical element (for example, a parabolic mirror) can also be used instead of the lens 15 as long as it can convert the laser light passed through the optical amplifier 14 into parallel light.

The laser light collimated by the lens 15 is irradiated to the measurement target gas GS. Of the laser light irradiated to the measurement target gas GS, a portion that is transmitted through the measurement target gas GS is reflected by a scatterer SM such as a wall. Afterward, it is again transmitted through the measurement target gas GS and becomes incident on the lens 16. Note that a distance between the gas analysis device 10 and the scatterer SM may be any distance but is set to, for example, no greater than about 100 [m].

The lens 16 condenses the laser light passed through the measurement target gas GS onto the photodetector 17. As such a lens 16, a condensing lens can be used. Note that another optical element (for example, a parabolic mirror) can also be used instead of the lens 16 as long as it can condense the laser light passed through the measurement target gas GS onto the photodetector 17. The photodetector 17 converts the laser light condensed by the lens 16 into an electrical signal and outputs this as the received signal. As this photodetector 17, for example, a PD (photodiode) can be used.

The amplifier 18 amplifies the received signal output from the photodetector 17. An amplification rate of the amplifier 18 is set to an appropriate amplification rate in response to, for example, an intensity of the laser light incident on the photodetector 17. When the photodetector 17 is a PD, as the amplifier 18, an IV conversion circuit that converts a photocurrent output as the received signal from the photodetector 17 into a voltage can be used.

The lock-in amplifier 19 uses the reference signal RS output from the signal generator 11 to detect a specific frequency component from the received signal amplified by the amplifier 18. For example, the lock-in amplifier 19 uses the reference signal RS output from the signal generator 11 to perform phase-sensitive detection and detects the 1f component (fundamental component) and the 2f component (first component) from the received signal amplified by the amplifier 18.

The signal processing device 20 is provided with a storage 21, a processor 22, and an output unit 23. It controls operations of the gas analysis device 10 and uses a detection result of the gas analysis device 10 (detection result of the lock-in amplifier 19) to measure the concentration of the measurement target gas GS. The signal processing device 20 is realized by, for example, a computer such as a personal computer.

The storage 21 stores a predetermined component (second component) of optical interference noise arising on an optical path of the laser light from the semiconductor laser 13 to the photodetector 17. For example, the storage 21 stores an amplitude $R_0$ and a phase $\theta_0$ of a component, among components of the optical interference noise, of the same frequency as the 2f component (referred to as a "2f noise component" hereinbelow). Note that the phase $\theta_0$ is a phase whose basis is a phase of the reference signal RS output from the signal generator 11. Here, the amplitude $R_0$ and the phase $\theta_0$ stored in the storage 21 is, for example, an amplitude and a phase of the 2f component detected by the lock-in amplifier 19 at a time when the measurement target gas GS is not present on the optical path of the laser light emitted from the gas analysis device 10 (or a concentration of the measurement target gas GS on the optical path of the laser light is sufficiently low). Here, "a concentration of the measurement target gas GS [being] sufficiently low" refers to a concentration of the measurement target gas GS on the optical path of the laser light being sufficiently lower than a concentration of the measurement target gas GS on the optical path of the laser light at a time of concentration measurement; this concentration may be lower than a detection limit of the gas analysis system 1.

The processor 22 uses the detection result of the gas analysis device 10 (detection result of the lock-in amplifier 19) and the amplitude $R_0$ and the phase $\theta_0$ of the 2f noise component stored in the storage 21 to calculate the concentration of the measurement target gas GS. For example, the processor 22 performs a computation of removing the amplitude $R_0$ and the phase $\theta_0$ of the 2f noise component stored in the storage 21 from an amplitude $R_{2f}$ and a phase $\theta_{2f}$ of the 2f component detected by the lock-in amplifier 19. The processor 22 thereby calculates an amplitude $R'_{2f}$ of a component wherein the 2f noise component is removed from the 2f component (referred to as a "noise-removed 2f component" hereinbelow; third component).

For example, the processor 22 performs the computation indicated in formula (4) below to calculate the amplitude $R'_{2f}$ of the noise-removed 2f component.

[Math. 4]

$$R'_{2f} = \sqrt{(R_{2f}\cos\theta - R_0\cos\theta_0)^2 + (R_{2f}\sin\theta - R_0\sin\theta_0)^2} \quad (4)$$

Figure 2:
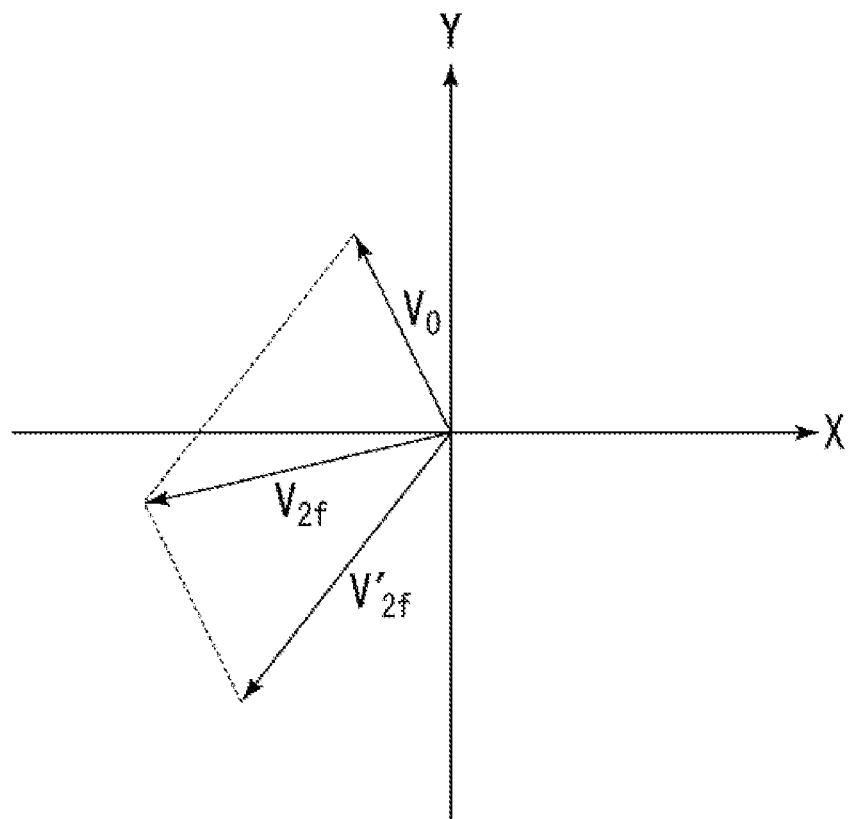
FIG. 2 is a diagram for describing a process performed in a processor in the first embodiment.

FIG. 2 is a diagram for describing a process performed in the processor in the first embodiment. The graph illustrated in FIG. 2 is a graph wherein a horizontal axis is an X output of the lock-in amplifier 19 and a vertical axis is a Y output thereof. Note that the graph illustrated in FIG. 2 can also be seen as a graph of a complex plane wherein the horizontal axis is a real axis and the vertical axis is an imaginary axis. In FIG. 2, the 2f component is represented as vector $V_{2f}$, and the 2f noise component is represented as vector $V_0$. Moreover, the noise-removed 2f component is represented as vector $V'_{2f}$.

Note that a length of vector $V_{2f}$ indicates an amplitude R of the 2f component and that a counterclockwise rotation angle of vector $V_{2f}$ relative to the positive real axis indicates a phase $\theta$ of the 2f component. Moreover, a length of vector $V_0$ indicates the amplitude $R_0$ of the 2f noise component, and a counterclockwise rotation angle of vector $V_0$ relative to the positive real axis indicates the phase $\theta_0$ of the 2f component. Likewise, a length of vector $V'_{2f}$ indicates the amplitude $R'_{2f}$ of the noise-removed 2f component, and a counterclockwise rotation angle of vector $V'_{2f}$ relative to the positive real axis indicates a phase of the noise-removed 2f component.

As illustrated in FIG. 2, the 2f component detected by the lock-in amplifier 19 (vector $V_{2f}$ in FIG. 2) is represented as a sum of the noise-removed 2f component (vector $V'_{2f}$ in FIG. 2) and the 2f noise component (vector $V_0$). Note that the noise-removed 2f component (vector $V'_{2f}$ in FIG. 2) is the original 2f component unaffected by the 2f noise component. The processor 22 uses formula (4) above to subtract vector $V_0$ from the 2f component detected by the lock-in amplifier 19 (vector $V_{2f}$ in FIG. 2) to calculate a length (amplitude $R'_{2f}$ of the noise-removed 2f component) of the original 2f component (vector $V'_{2f}$ in FIG. 2).

Furthermore, the processor 22 measures the concentration of the measurement target gas GS based on a ratio of the amplitude $R'_{2f}$ of the noise-removed 2f component relative to an amplitude $R_{1f}$ of the 1f component detected by the lock-in amplifier 19 ($R'_{2f}/R_{1f}$). Here, the concentration of the measurement target gas GS is measured based on the above ratio in order to reduce an effect of fluctuations in a light reception amount of the laser light due to factors other than the measurement target gas.

The output unit 23 outputs a computation result of the processor 22 to the outside. For example, the output unit 23 outputs information indicating the concentration of the measurement target gas GS measured by the processor 22. Note that the output unit 23 may output, other than the information indicating the concentration of the measurement target gas GS, information indicating the 2f component, information indicating the 1f component, information indicating the 2f noise component, and other various information. The output unit 23 may output to the outside a signal indicating the above information or perform output to the outside by displaying the above information.

<Gas Analysis Method>

Figure 3:
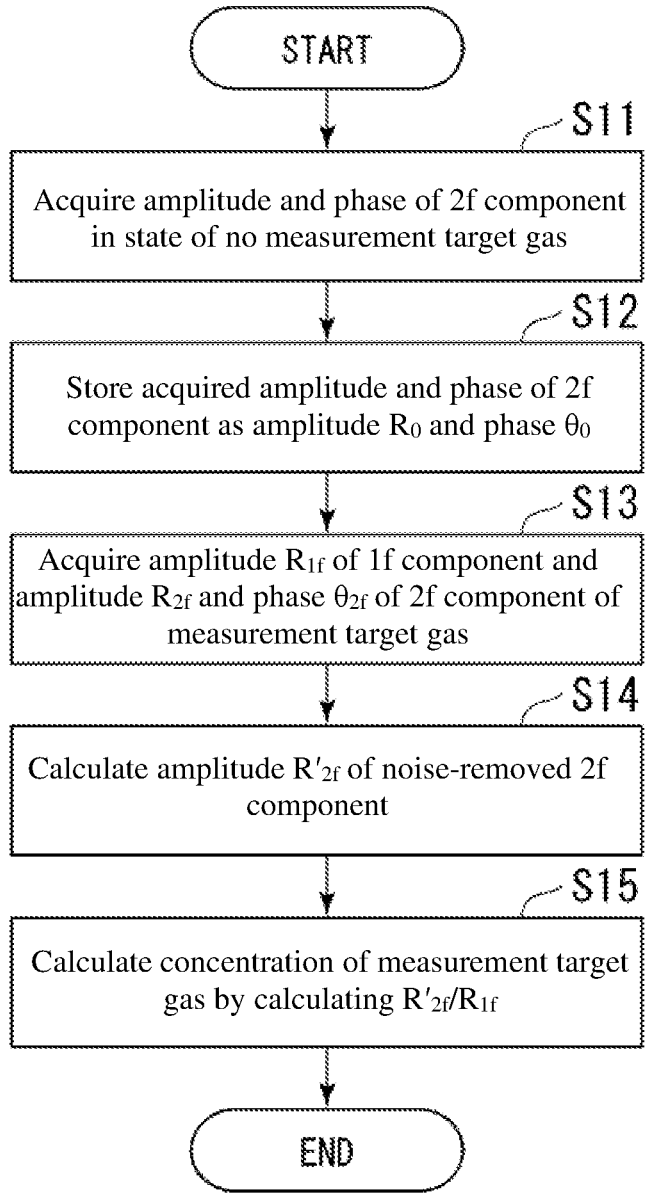
FIG. 3 is a flowchart illustrating a gas analysis method according to the first embodiment.

FIG. 3 is a flowchart illustrating a gas analysis method according to the first embodiment. First, prior to measuring the measurement target gas GS, a process of acquiring the amplitude $R_0$ and the phase $\theta_0$ of the 2f noise component is performed.

For example, at the time when the measurement target gas GS is not present, a process of emitting the laser light modulated by the modulation frequency f, detecting the laser light reflected by the scatterer SM by the photodetector 17, and detecting the received signal output from the photodetector 17 by the lock-in amplifier 19 is performed in the gas analysis device 10. Then, a process of acquiring an amplitude and a phase of the 2f component detected by the lock-in amplifier 19 (step S11) and storing the acquired amplitude and phase of the 2f component as the amplitude $R_0$ and the phase $\theta_0$ in the storage 21 is performed in the signal processing device 20 (step S12).

Next, the measurement target gas GS is measured. For example, in a state where the measurement target gas GS is present, a process of emitting the laser light modulated by the modulation frequency f (first step), obtaining the received signal by detecting the laser light passed through the measurement target gas GS by the photodetector 17 (second step), and detecting the received signal by the lock-in amplifier 19 is performed in the gas analysis device 10. Then, a process of acquiring the amplitude $R_{1f}$ of the 1f component and the amplitude $R_{2f}$ and phase $\theta_{2f}$ of the 2f component of the measurement target gas detected by the lock-in amplifier 19 is performed in the signal processing device 20 (step S13).

Next, a process of performing the computation indicated by formula (4) above to calculate the amplitude $R'_{2f}$ of the noise-removed 2f component is performed in the processor 22 (step S14; third step). For example, a process of calculating the amplitude $R'_{2f}$ of the noise-removed 2f component by substituting the amplitude $R_0$ and the phase $\theta_0$ stored in the storage 21 at step S12 and the amplitude $R_{2f}$ and the phase $\theta_{2f}$ of the 2f component acquired at step S13 into formula (4) above is performed in the processor 22.

Next, a process of calculating the concentration of the measurement target gas GS by calculating the ratio of the amplitude $R'_{2f}$ of the noise-removed 2f component relative to the amplitude $R_{1f}$ of the 1f component obtained at step S13 ($R'_{2f}/R_{1f}$) is performed in the processor 22 (step S15; fourth step). Then, the information indicating the concentration of the measurement target gas GS measured by the processor 22 is output from the output unit 23. Subsequently, the processes of steps S13 to S15 are repeatedly performed at certain time intervals prescribed in advance.

Figure 4A:
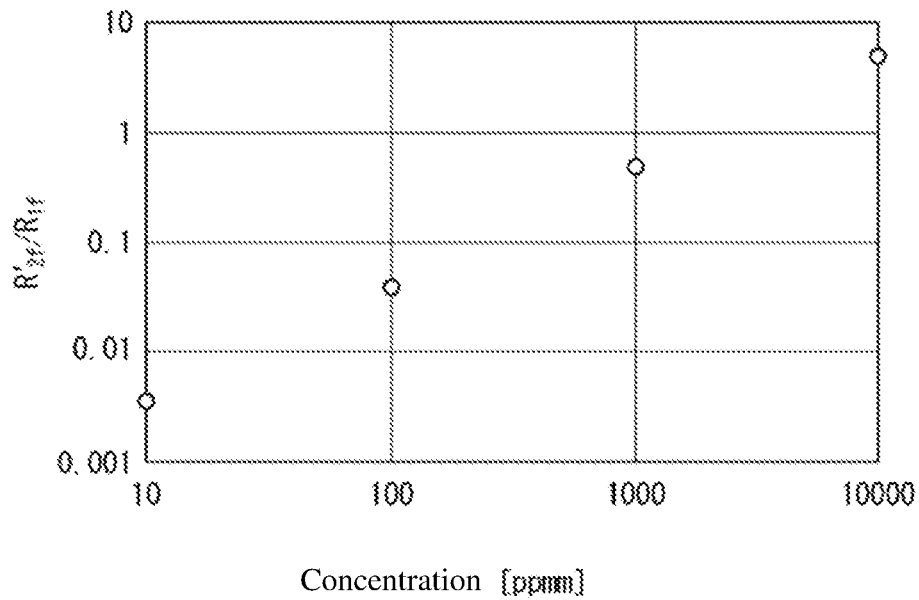
FIGS. 4A and 4B are diagrams illustrating measurement results of the gas analysis system according to the first embodiment.
Figure 4B:
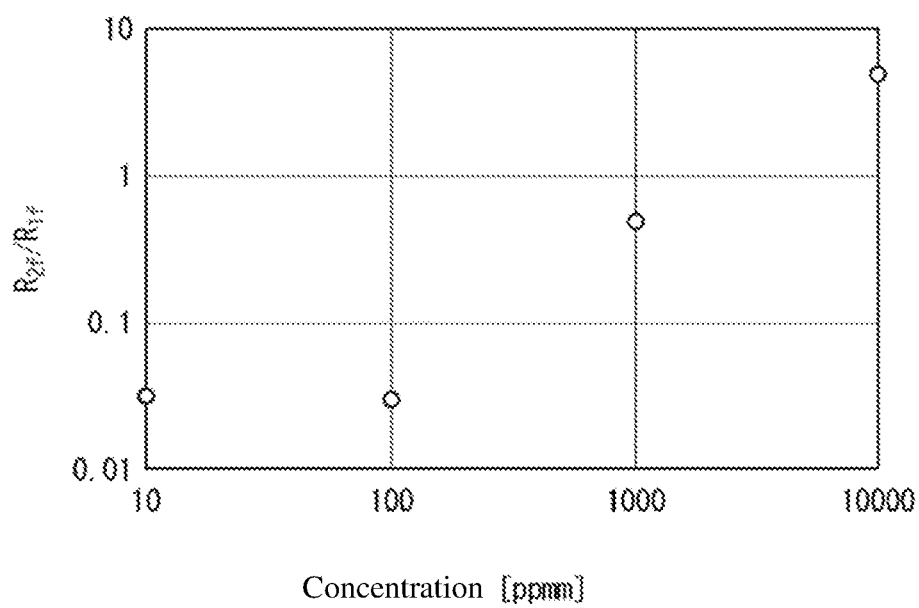

FIG. 4 is a diagram illustrating a measurement result of the gas analysis system according to the first embodiment. The measurement results illustrated in FIG. 4 are results of measuring methane ($CH_4$) gas as the measurement target gas; (a) in FIG. 4 is a diagram illustrating the measurement result of the gas analysis system 1 of the present embodiment, and (b) in FIG. 4 is a diagram illustrating a measurement result of a conventional gas analysis system. Note that the measurement result illustrated in (a) in FIG. 4 indicates a relationship between, on one hand, the amplitude ratio between the noise-removed 2f component and the 1f component ($R'_{2f}/R_{1f}$) and, on the other, a concentration of the methane gas, and the measurement result illustrated in (b) in FIG. 4 indicates a relationship between, on one hand, an amplitude ratio between the 2f component and the 1f component ($R_{2f}/R_{1f}$) and, on the other, the concentration of the methane gas.

Referring to the measurement result illustrated in (b) in FIG. 4, when the concentration is no greater than 100 [ppmm], the linearity of the graph illustrating the relationship between, on one hand, the amplitude ratio between the 2f component and the 1f component ($R_{2f}/R_{1f}$) and, on the other, the concentration of the methane gas is disrupted. It is thereby understood that conventionally, the concentration of the measurement target gas is not being able to be precisely measured when the concentration is no greater than 100 [ppmm]. In contrast, referring to the measurement result illustrated in (a) in FIG. 4, the linearity of the graph illustrating the relationship between, on one hand, the amplitude ratio between the noise-removed 2f component and the 1f component ($R'_{2f}/R_{1f}$) and, on the other, the concentration of the methane gas is maintained even if the concentration is no greater than 100 [ppmm]. It is thereby understood that in the present embodiment, the concentration of the measurement target gas is being able to be precisely measured even if the concentration of the measurement target gas is low.

As above, in the present embodiment, first, the laser light modulated by the predetermined modulation frequency f is emitted, and the received signal is obtained by receiving the laser light passed through the measurement target gas GS. Next, the 2f noise component arising on the optical path of the laser light is removed from the 2f component included in the received signal to obtain the noise-removed 2f component. Then, the concentration of the measurement target gas GS is found based on a magnitude of the noise-removed 2f component. This enables improvement of a detection limit of the concentration of the measurement target gas GS without giving rise to demerits such as increased costs, a complicated configuration, reduced freedom in design, and cumbersome adjustment.

In this manner, by using not only amplitude information but also phase information, the present embodiment can remove a component having a set phase, such as optical interference noise. This enables precise measurement of the concentration of the measurement target gas GS up to a detection-limit level determined by RIN (relative intensity noise) of the semiconductor laser 13 and white noise of circuits such as the amplifier 18.

Second Embodiment

Next, a second embodiment is described. The gas analysis system in the present embodiment has a configuration similar to the gas analysis system 1 illustrated in FIG. 1. The present embodiment and the first embodiment above differ in an acquisition method of the amplitude $R_0$ and the phase $\theta_0$ of the 2f noise component. That is, the present embodiment and the first embodiment differ in processes of steps S11, S12 illustrated in FIG. 3.

In the first embodiment above, in the process of step S11 illustrated in FIG. 3, the amplitude and the phase of the 2f component detected by the lock-in amplifier 19 are acquired at the time when the measurement target gas GS is not present on the optical path of the laser light emitted from the gas analysis device 10. Then, in the process of step S11 illustrated in FIG. 3, the acquired amplitude and phase of the 2f component are stored in the storage 21 as the amplitude $R_0$ and the phase $\theta_0$ of the 2f noise component.

In contrast, the present embodiment acquires an amplitude and a phase of the 2f component detected by the lock-in amplifier 19 at a time when the measurement target gas GS is present on the optical path of the laser light at a known first concentration. It also acquires an amplitude and a phase of the 2f component detected by the lock-in amplifier 19 at a time when the measurement target gas GS is present on the optical path of the laser light at a known second concentration. Then, using the two amplitudes and phases that are acquired and the concentrations of the measurement target gas GS (first concentration, second concentration), the amplitude $R_0$ and the phase $\theta_0$ of the 2f noise component are found by computation.

When calculating the amplitude $R_0$ and the phase $\theta_0$ of the 2f noise component, two types of gas cells where the measurement target gas GS is enclosed on the optical path of the laser light may be disposed. For example, the amplitudes and the phases of the 2f component detected by the lock-in amplifier 19 may be acquired by alternatingly disposing on the optical path of the laser light a gas cell wherein the measurement target gas GS is enclosed at the first concentration above and a gas cell wherein the measurement target gas GS is enclosed at the second concentration above.

Figure 5:
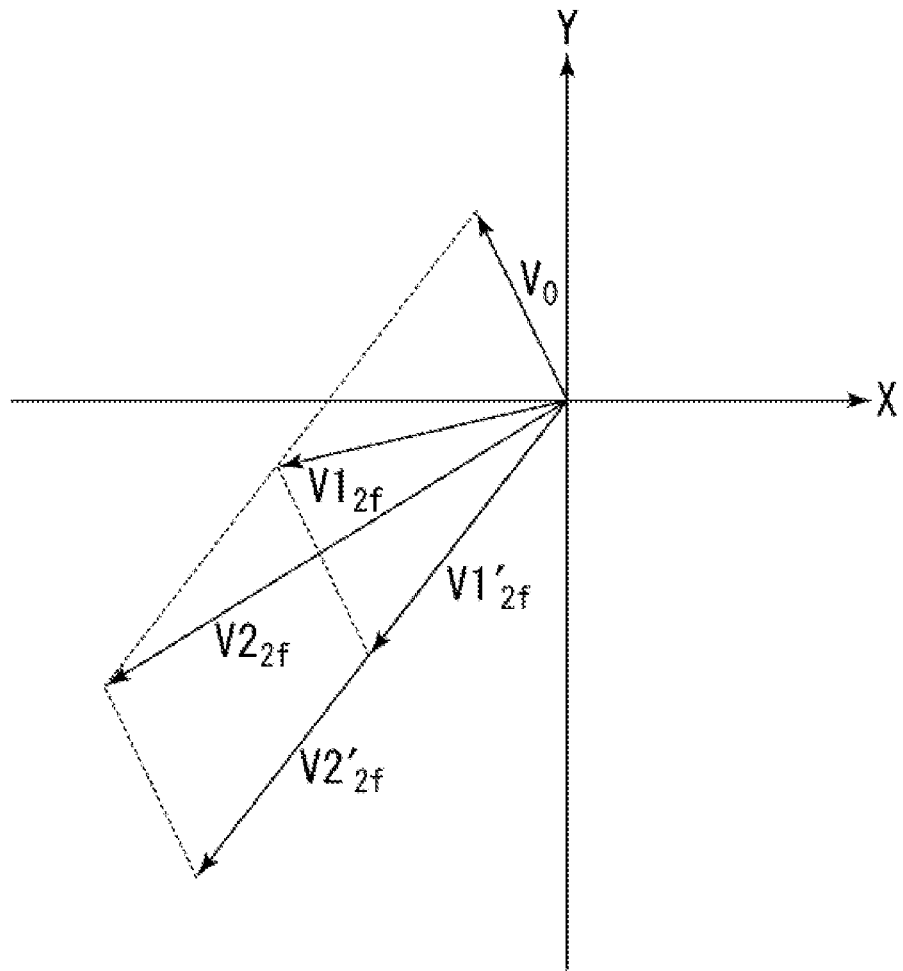
FIG. 5 is a diagram for describing a method of calculating a 2f noise component in a second embodiment.

FIG. 5 is a diagram for describing the method of calculating the 2f noise component in the second embodiment. Note that in FIG. 5, like FIG. 2, the horizontal axis is the X output of the lock-in amplifier 19, and the vertical axis is the Y output thereof. Note that like FIG. 2, the graph illustrated in FIG. 5 can also be seen as a graph of a complex plane wherein the horizontal axis is a real axis and the vertical axis is an imaginary axis.

In FIG. 5, the 2f component detected by the lock-in amplifier 19 at the time when the measurement target gas GS is present on the optical path of the laser light at the known first concentration is represented as vector $V1_{2f}$. Moreover, the 2f component detected by the lock-in amplifier 19 at the time when the measurement target gas GS is present on the optical path of the laser light at the known second concentration is represented as vector $V2_{2f}$. Moreover, the 2f noise component is represented as vector $V_0$.

Note that vector $V1'_{2f}$ in FIG. 5 indicates the original 2f component unaffected by the 2f noise component at the time when the measurement target gas GS is present at the first concentration. Moreover, vector $V2'_{2f}$ indicates the original 2f component unaffected by the 2f noise component at the time when the measurement target gas GS is present at the second concentration. A length (amplitude) of vector $V1'_{2f}$ is a length according to the first concentration of the measurement target gas GS. Likewise, a length (amplitude) of vector $V2'_{2f}$ is a length according to the second concentration of the measurement target gas GS. The first concentration of the measurement target gas GS is referred to as d1, and the second concentration of the measurement target gas GS is referred to as d2.

The signal processing device 20 calculates the 2f noise component (vector $V_0$) by performing the computation indicated in formula (5) below.

[Math. 5]

$$V_0 = \frac{d2}{d2-d1} V1_{2f} - \frac{d1}{d2-d1} V2_{2f} \quad (5)$$

Note that the length of vector $V_0$ is the amplitude $R_0$ of the 2f noise component, and the counterclockwise rotation angle of vector $V_0$ relative to the positive real axis is the phase $\theta_0$ of the 2f noise component. The amplitude $R_0$ and the phase $\theta_0$ of the 2f noise component found in this manner are stored in the storage 21.

As above, the present embodiment and the first embodiment above only differ in the acquisition method of the amplitude $R_0$ and the phase $\theta_0$ of the 2f noise component. In the present embodiment as well, like the first embodiment, the 2f noise component arising on the optical path of the laser light is removed from the 2f component included in the received signal to obtain the noise-removed 2f component, and the concentration of the measurement target gas GS is found based on the magnitude of the noise-removed 2f component. This enables improvement of a detection limit of the concentration of the measurement target gas GS without giving rise to demerits such as increased costs, a complicated configuration, reduced freedom in design, and cumbersome adjustment.

Third Embodiment

Next, a third embodiment is described. The gas analysis system in the present embodiment has a configuration similar to the gas analysis system 1 illustrated in FIG. 1. The present embodiment and the first embodiment above differ in an acquisition method of the amplitude $R_0$ and the phase $\theta_0$ of the 2f noise component and a process of calculating the amplitude $R'_{2f}$ of the noise-removed 2f component performed by the processor 22. The present embodiment is for a situation wherein a modulation frequency is high and a measurement distance (optical path length of the laser light) changes variously.

When the modulation frequency is high and the measurement distance (optical path length of the laser light) changes variously, the phase of the laser light (laser light detected by the photodetector 17) relative to the reference signal RS used in the lock-in amplifier 19 changes. The present embodiment enables an improved detection limit of the concentration of the measurement target gas GS by correcting such a phase change.

In the present embodiment, the storage 21 stores a phase $\theta_{01f}$ of the 1f component and an amplitude $R_{01f}$ and phase $\theta_{02f}$ of the 2f noise component from when the optical path length of the laser light is set to a reference length prescribed in advance (for example, 0 [m]). Note that in the present embodiment, the amplitude and the phase of the 2f noise component are written as "amplitude $R_{02f}$" and "phase $\theta_{02f}$" so as to be differentiated from the amplitude $R_0$ and the phase $\theta_0$ of the 2f noise component in the first and second embodiments. The phases $\theta_{01f}$, $\theta_{02f}$ are phases whose basis is the phase of the reference signal RS output from the signal generator 11.

In the present embodiment, the processor 22 calculates a phase difference $\varphi$ between the phase $\theta_{1f}$ of the 1f component obtained when the optical path length of the laser light is not set to the reference length and the phase $\theta_{01f}$ of the 1f component obtained when the optical path length of the laser light is set to the reference length. Moreover, the processor 22 uses the detection result of the gas analysis device 10 (detection result of the lock-in amplifier 19) and the amplitude $R_{01f}$ and the phase $\theta_{02f}$ of the 2f noise component stored in the storage 21 to calculate the concentration of the measurement target gas GS.

For example, the processor 22 performs a computation of removing the amplitude $R_{01f}$ and the phase $\theta_{02f}$ of the 2f noise component stored in the storage 21 from the amplitude Ref and the phase $\theta_{2f}$ of the 2f component detected by the lock-in amplifier 19. At this time, the processor 22 corrects the phase $\theta_{2f}$ of the 2f component in consideration of the above phase difference $\varphi$ of the 1f component.

For example, the processor 22 performs the computation indicated in formula (6) below to calculate the amplitude $R'_{2f}$ of the noise-removed 2f component.

[Math. 6]

$$R'_{2f} = \sqrt{\{R_{2f}\cos(\theta_{2f}-\varphi)-R_{02f}\cos\theta_{02f}\}^2 + \{R_{2f}\sin(\theta_{2f}-\varphi)-R_{02f}\sin\theta_{02f}\}^2} \quad (6)$$

Figure 6:
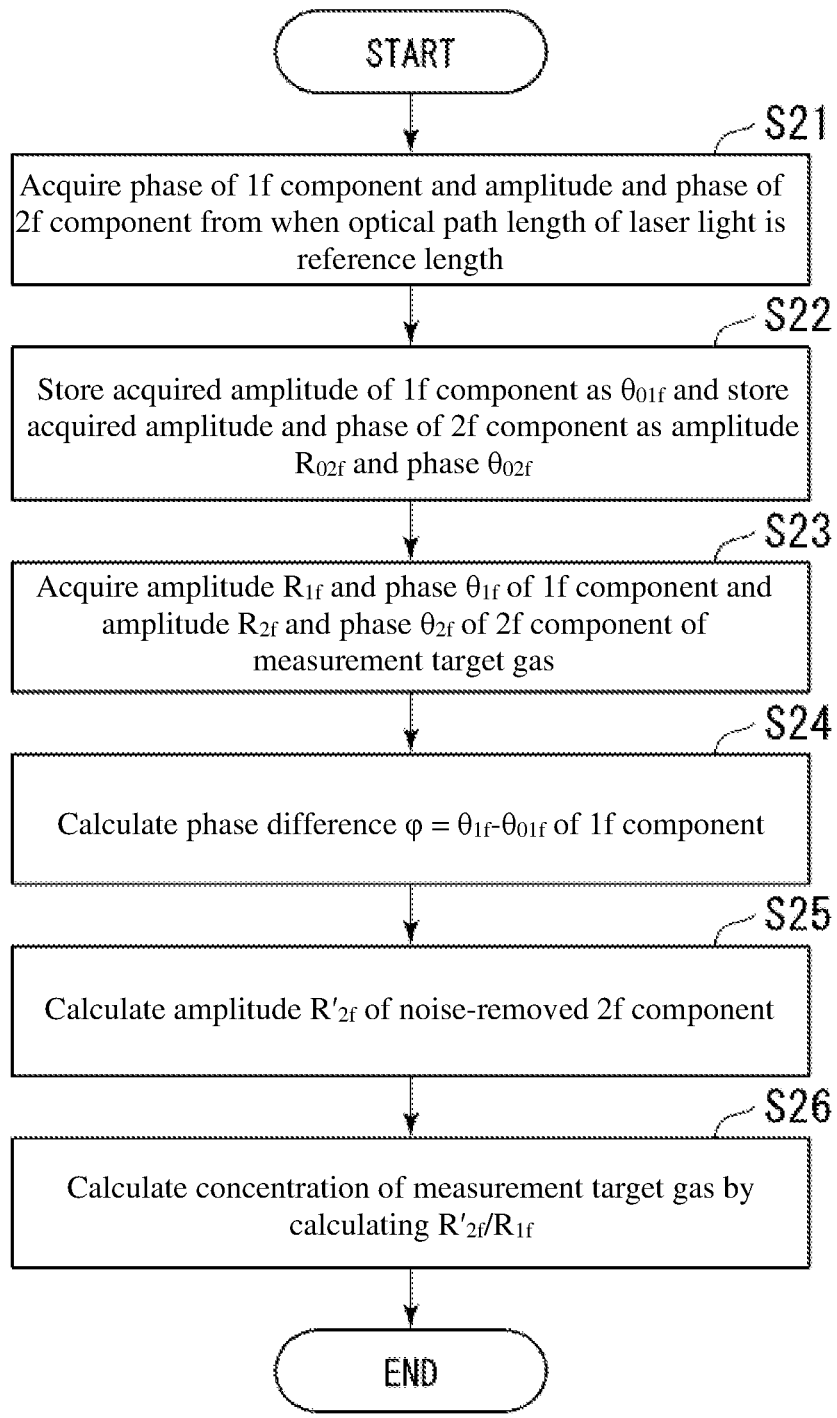
FIG. 6 is a flowchart illustrating a gas analysis method according to a third embodiment.

FIG. 6 is a flowchart illustrating the gas analysis method according to the third embodiment. First, prior to measuring the measurement target gas GS, a process of acquiring the phase $\theta_{01f}$ of the 1f component and the amplitude $R_{02f}$ and phase $\theta_{02f}$ of the 2f noise component from when the optical path length of the laser light is set to the reference length is performed. Note that as a method of setting the optical path length of the laser light to the reference length, for example, a method of disposing a jig on the optical path of the laser light can be mentioned.

A process of emitting the laser light modulated by the modulation frequency f in a state where the optical path length of the laser light is set to the reference length; detecting the laser light, upon its being reflected by, for example, the jig, by the photodetector 17; and detecting the received signal output from the photodetector 17 by the lock-in amplifier 19 is performed in the gas analysis device 10. Then, a process of acquiring a phase of the 1f component and an amplitude and phase of the 2f component detected by the lock-in amplifier 19 is performed in the signal processing device 20 (step S21). Moreover, a process of storing the acquired phase of the 1f component as the phase $\theta_{01f}$ in the storage 21 and storing the acquired amplitude and phase of the 2f component as the amplitude $R_{02f}$ and the phase $\theta_{02f}$ in the storage 21 is performed in the signal processing device 20 (step S22).

Next, the measurement target gas GS is measured. For example, in a state where the above jig is removed from the optical path of the laser light and the measurement target gas GS is present on the optical path of the laser light, a process of emitting the laser light modulated by the modulation frequency f (first step), obtaining the received signal by detecting the laser light passed through the measurement target gas GS by the photodetector 17 (second step), and detecting the received signal by the lock-in amplifier 19 is performed in the gas analysis device 10. Then, a process of acquiring the amplitude $R_{1f}$ and the phase $\theta_{1f}$ of the 1f component and the amplitude Ref and the phase $\theta_{2f}$ of the 2f component of the measurement target gas detected by the lock-in amplifier 19 is performed in the signal processing device 20 (step S23).

Next, a process of calculating the phase difference φ between the phase $\theta_{1f}$ of the 1f component acquired at step S23 and the phase $\theta_{01f}$ of the 1f component stored in the storage 21 is performed in the processor 22 (step S24). Next, a process of performing the computation indicated by formula (6) above to calculate the amplitude $R'_{2f}$ of the noise-removed 2f component in consideration of the phase difference φ of the 1f component is performed in the processor 22 (step S25; third step). For example, a process of calculating the amplitude $R'_{2f}$ of the noise-removed 2f component by substituting the amplitude $R_{02f}$ and the phase $\theta_{02f}$ stored in the storage 21 at step S22, the amplitude Ref and the phase $\theta_{2f}$ of the 2f component acquired at step S23, and the phase difference φ calculated at step S14 into formula (6) above is performed in the processor 22.

Next, a process of calculating the concentration of the measurement target gas GS by calculating the ratio of the amplitude $R'_{2f}$ of the noise-removed 2f component relative to the amplitude $R_{1f}$ of the 1f component obtained at step S23 ($R'_{2f}/R_{1f}$) is performed in the processor 22 (step S26; fourth step). Then, the information indicating the concentration of the measurement target gas GS measured by the processor 22 is output from the output unit 23. Subsequently, the processes of steps S23 to S26 are repeatedly performed at certain time intervals prescribed in advance.

As above, the present embodiment and the first embodiment above only differ in the acquisition method of the amplitude $R_{02f}$ and the phase $\theta_{02f}$ of the 2f noise component and the process of calculating the amplitude $R'_{2f}$ of the noise-removed 2f component performed by the processor 22. In the present embodiment as well, like the first embodiment, the 2f noise component arising on the optical path of the laser light is removed from the 2f component included in the received signal to obtain the noise-removed 2f component, and the concentration of the measurement target gas GS is found based on the magnitude of the noise-removed 2f component. This enables improvement of a detection limit of the concentration of the measurement target gas GS without giving rise to demerits such as increased costs, a complicated configuration, reduced freedom in design, and cumbersome adjustment.

Furthermore, the present embodiment calculates the phase difference y between the phase $\theta_{1f}$ of the 1f component obtained when the optical path length of the laser light is not set to the reference length and the phase $\theta_{01f}$ of the 1f component obtained when the optical path length of the laser light is set to the reference length and corrects the phase $\theta_{2f}$ of the 2f component. This enables improvement of the detection limit of the concentration of the measurement target gas GS even when the modulation frequency is high and the measurement distance (optical path length of the laser light) changes variously.

The gas analysis systems and the gas analysis methods according to one or more embodiments are described above. However, the present invention is not limited to the above embodiments and can be freely modified within the scope of the present invention. For example, the above embodiments describe a situation of measuring the concentration of the measurement target gas GS based on the second-order harmonic component (2f component) of the modulation frequency f of the laser light. However, the concentration of the measurement target gas GS may be measured based on an nth-order harmonic component (n being an integer no less than 3) of the modulation frequency f of the laser light.

Furthermore, the above embodiments describe an example of detecting the 1f component and the 2f component included in the received signal output from the photodetector 17 by the lock-in amplifier 19. However, the lock-in amplifier 19 may be omitted, and the signal processing device 20 may be equipped with the functions of the lock-in amplifier 19 so a signal processing unit detects the 1f component and the 2f component included in the received signal. Alternatively, the signal processing device 20 may be equipped with an FFT (fast Fourier transform) function instead of the functions of the lock-in amplifier 19 so a signal processing unit detects the 1f component and the 2f component included in the received signal.

Note that the functions of the signal processing device 20 provided in the gas analysis systems of the above embodiments may be realized as software by installing a program that realizes these functions on a computer. That is, the functions of the signal processing device 20 may be realized by cooperation between software and hardware resources. Note that the functions of the signal processing device 20 may be realized using hardware such as an FPGA (field-programmable gate array), LSI (large-scale integration), or an ASIC (application-specific integrated circuit).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Gas analysis system
13 Semiconductor laser
17 Photodetector
19 Lock-in amplifier
20 Signal processing device
21 Storage
22 Processor
f Modulation frequency
GS Measurement target gas

What is claimed is:

1. A gas analysis system, comprising:
a laser configured to emit a laser light modulated by a predetermined modulation frequency;
a photodetector configured to:
receive the laser light that has passed through a measurement target gas; and
upon receiving the laser light, output a received signal having an N-frequency that is n times the predetermined modulation frequency, wherein n is an integer no less than 2;
a processor configured to calculate:
a third component by removing, from a first component having the N-frequency, a second component, wherein the second component is a component of optical interference noise arising on an optical path of the laser light from the laser to the photodetector and has the same frequency as the first component; and based on a magnitude of the third component, a concentration of the measurement target gas;

a detector configured to detect:
an amplitude and a phase of the first component included in the received signal; and
a fundamental component that is a component having the same frequency as the modulation frequency included in the received signal; and a storage configured to store an amplitude and a phase of the second component, wherein the processor is configured to calculate:
the third component using the amplitude and the phase of the first component detected by the detector and the amplitude and the phase of the second component stored in the storage to perform a computation of removing the second component from the first component, and the concentration of the measurement target gas based on a ratio of an amplitude of the third component to an amplitude of the fundamental component.

2. The gas analysis system according to claim 1, wherein the amplitude and the phase of the second component stored in the storage are the amplitude and the phase of the first component detected by the detector at a time when the measurement target gas is not present on the optical path of the laser light or a state where the concentration of the measurement target gas on the optical path of the laser light is sufficiently low.

3. The gas analysis system according to claim 1, wherein the amplitude and the phase of the second component stored in the storage are an amplitude and a phase obtained by performing a predetermined computation using the amplitude and the phase of the first component detected by the detector at a time when the measurement target gas is present on the optical path of the laser light at a known first concentration and the amplitude and the phase of the first component detected by the detector at a time when the measurement target gas is present on the optical path of the laser light at a known second concentration.

4. The gas analysis system according to claim 1, wherein the amplitude and the phase of the second component stored in the storage are the amplitude and the phase of the first component detected by the detector at a time when an optical path length of the laser light is set to a reference length prescribed in advance, and the processor is configured to calculate the third component by performing the computation of removing the second component from the first component upon correcting, based on a difference between a phase of the fundamental component detected by the detector at a time when the optical path length of the laser light is not set to the reference length and the phase of the fundamental component detected by the detector at the time when the optical path length of the laser light is set to the reference length, the phase of the first component detected by the detector at the time when the optical path length of the laser light is not set to the reference length.

5. A gas analysis method, comprising:
emitting a laser light modulated by a predetermined modulation frequency;
receiving the laser light that has passed through a measurement target gas;
upon receiving the laser light, obtaining a received signal having an N-frequency that is n times the predetermined modulation frequency, wherein n is an integer no less than 2;
calculating:
a third component by removing, from a first component having the N-frequency, a second component, wherein the second component is a component of optical interference noise arising on an optical path of the laser light and has the same frequency as the first component; and
based on a magnitude of the third component a concentration of the measurement target gas;
detecting:
an amplitude and a phase of the first component included in the received signal; and
a fundamental component that is a component having the same frequency as the modulation frequency included in the received signal;
storing an amplitude and a phase of the second component; and
calculating:
the third component using the amplitude and the phase of the first component detected by the detector and the amplitude and the phase of the second component stored in the storage to perform a computation of removing the second component from the first component, and
the concentration of the measurement target gas based on a ratio of an amplitude of the third component to an amplitude of the fundamental component.

6. The gas analysis method according to claim 5, further comprising: calculating the second component before measuring the measurement target gas.

* * * * *